United States Patent
Burton et al.

(10) Patent No.: US 9,047,492 B2
(45) Date of Patent: Jun. 2, 2015

(54) APPARATUS, SYSTEMS AND METHODS FOR SECURELY STORING MEDIA CONTENT EVENTS ON A FLASH MEMORY DEVICE

(75) Inventors: David Robert Burton, Skipton (GB); Matthew Stephens, Harrogate (GB); Greg Blythe, Wilberfoss (GB)

(73) Assignee: EchoStar UK Holdings Limited, Steeton (GB)

( * ) Notice: Subject to any disclaimer, the term of this patent is extended or adjusted under 35 U.S.C. 154(b) by 634 days.

(21) Appl. No.: 13/053,492

(22) Filed: Mar. 22, 2011

(65) Prior Publication Data

US 2012/0246717 A1    Sep. 27, 2012

(51) Int. Cl.
*G06F 21/00* (2013.01)
*G06F 21/78* (2013.01)
*G06F 21/31* (2013.01)

(52) U.S. Cl.
CPC ............... *G06F 21/78* (2013.01); *G06F 21/31* (2013.01)

(58) Field of Classification Search
CPC .......... G06F 21/44; G06F 21/31; G06F 21/07
USPC ............................................ 726/21; 713/156
See application file for complete search history.

(56) References Cited

U.S. PATENT DOCUMENTS

| | | |
|---|---|---|
| 5,296,739 A | 3/1994 | Heilbronner et al. |
| 5,911,582 A | 6/1999 | Redford et al. |
| 5,921,757 A | 7/1999 | Tsutsui et al. |
| 6,128,194 A | 10/2000 | Francis |
| 6,212,074 B1 | 4/2001 | Gonsalves et al. |
| 6,219,236 B1 | 4/2001 | Hirano et al. |
| 6,577,504 B1 | 6/2003 | Lofland et al. |
| 6,665,187 B1 | 12/2003 | Alcoe et al. |
| 6,818,276 B2 | 11/2004 | Bourdelais et al. |
| 6,946,856 B1 | 9/2005 | Tellkamp |
| 6,982,877 B2 | 1/2006 | Vinson et al. |
| 7,236,368 B2 | 6/2007 | Maxwell et al. |
| 7,310,233 B2 | 12/2007 | Bell |
| 7,312,534 B2 | 12/2007 | delos Santos et al. |
| 7,345,885 B2 | 3/2008 | Boudreaux et al. |
| 7,550,825 B2 | 6/2009 | Santos et al. |
| 7,629,400 B2 | 12/2009 | Hyman |
| 7,742,299 B2 | 6/2010 | Sauciuc et al. |

(Continued)

FOREIGN PATENT DOCUMENTS

| | | |
|---|---|---|
| WO | WO 03/107427 | 12/2003 |
| WO | WO 2009/058149 | 5/2009 |

OTHER PUBLICATIONS

Lee et al, USB PassOn: Secure USB Thumb Drive Forensic Toolkit, IEEE, Publication Year: 2008 , pp. 279-282.*

(Continued)

*Primary Examiner* — Luu Pham
*Assistant Examiner* — Ali Shayanfar
(74) *Attorney, Agent, or Firm* — Lowe Graham Jones PLLC

(57) ABSTRACT

Systems and methods are operable to securely store media content events on a flash memory device. An exemplary embodiment receives user-provided authorization information, compares the received user-provided authorization information with authorization information associated with the flash memory device, and permits access to a flash memory of the flash memory device when the received user-provided authorization information corresponds to the authorization information.

18 Claims, 2 Drawing Sheets

(56) References Cited

U.S. PATENT DOCUMENTS

| | | | |
|---|---|---|---|
| 7,810,161 | B2* | 10/2010 | Jeong .......................... 726/26 |
| 2005/0008832 | A1 | 1/2005 | Santos et al. |
| 2005/0108769 | A1* | 5/2005 | Arnold et al. ................ 725/115 |
| 2005/0266295 | A1 | 12/2005 | Takai |
| 2006/0064757 | A1* | 3/2006 | Poslinski .................... 726/26 |
| 2007/0278683 | A1 | 12/2007 | Santos et al. |
| 2008/0010685 | A1* | 1/2008 | Holtzman et al. ............ 726/27 |
| 2008/0095515 | A1* | 4/2008 | Miyamoto .................... 386/95 |
| 2008/0135216 | A1 | 6/2008 | Zhang et al. |
| 2009/0077652 | A1* | 3/2009 | Choi et al. .................... 726/16 |
| 2009/0193517 | A1* | 7/2009 | Machiyama .................. 726/18 |
| 2009/0287917 | A1* | 11/2009 | Carpenter et al. ............ 713/2 |
| 2009/0313433 | A1* | 12/2009 | Asakura ........................ 711/115 |
| 2010/0205659 | A1* | 8/2010 | Suzuki .......................... 726/5 |
| 2010/0261386 | A1 | 10/2010 | Blum et al. |
| 2010/0328426 | A1* | 12/2010 | Matsubara .................... 348/42 |
| 2011/0265176 | A1* | 10/2011 | Khosrowpour et al. ........ 726/19 |
| 2012/0216234 | A1* | 8/2012 | Kemp ............................ 725/110 |
| 2012/0246717 | A1* | 9/2012 | Burton et al. ................. 726/21 |

OTHER PUBLICATIONS

Yim et al, A Secure Solution for USB Flash Drives Using Fat File System Structure, IEEE, Publication Year: 2010 , pp. 487-492.*

PiezoFans, LLC—Piezo Fans and Piezoelectric Technology, "Advanced Micro-Cooling Systems" Product Description, http://piezofans.com/, download date Mar. 4, 2011, 2 pages.

Stephens et al., Matthew, "Passive, Low-Profile Heat Transferring System," U.S. Appl. No. 13/051,930, filed Mar. 18, 2011.

Burton et al., David Robert, "Media Content Device Chassis with Internal Extension Members," U.S. Appl. No. 13/052,685, filed Mar. 21, 2011.

Burton et al., David Robert, "Media Device Having a Piezoelectric Fan," U.S. Appl. No. 13/074,964, filed Mar. 29, 2011.

Burton et al., David Robert, "Media Content Device with Customized Panel," U.S. Appl. No. 13/074,971, filed Mar. 29, 2011.

Hardaker et al., Trevor, "Apparatus, Systems and Methods for Detecting Infrared Signals at a Media Device Configured to be Positioned in Different Orientations," U.S. Appl. No. 13/036,943, filed Feb. 28, 2011.

Burton et al., David Robert, "Apparatus, Systems and Methods for Power Line Carrier Data Communication to DC Powered Electronic Device," U.S. Appl. No. 13/074,736, filed Mar. 29, 2011.

Burton et al., David Robert, "Apparatus, Systems and Methods for Control of Inappropriate Media Content Events," U.S. Appl. No. 13/053,487, filed Mar. 22, 2011.

* cited by examiner

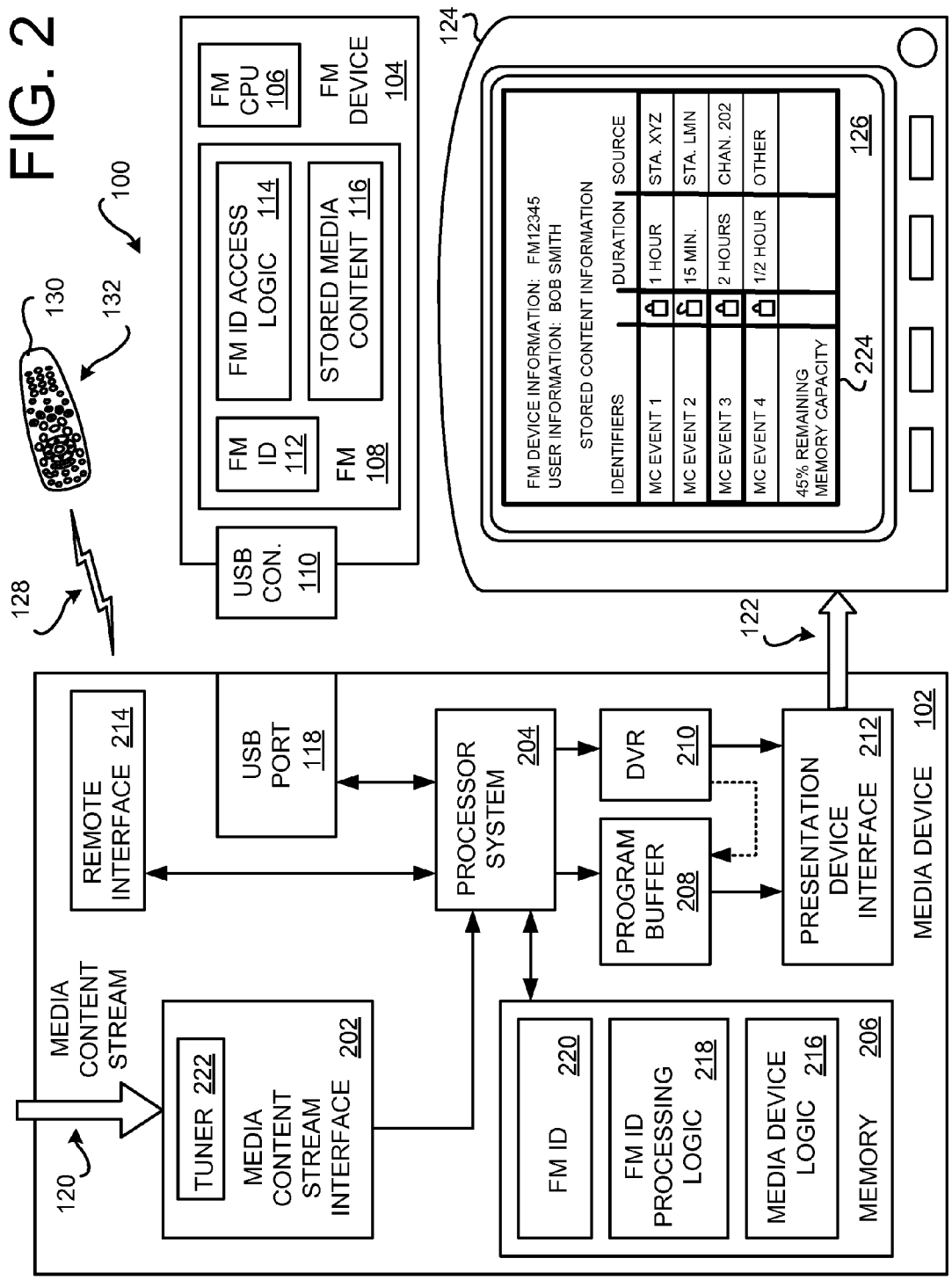

APPARATUS, SYSTEMS AND METHODS FOR SECURELY STORING MEDIA CONTENT EVENTS ON A FLASH MEMORY DEVICE

BACKGROUND

Media devices, such as a set top box, a stereo, a television, a computer system, a game system, or the like, are often configured to receive a portable memory medium, such as a flash memory (FM) device that employs a universal serial bus (USB) connector. The storage capacity of such flash memory devices are sufficient to store media content that has been received by the media device. For example, the user of the media device may download a movie or a serial program event for later viewing and/or viewing on another media device.

However, the flash memory device must be kept under the physical control of the user who has stored the media content of interest on the flash memory device. For example, another user may obtain the flash memory device, and might delete or record over previously stored media content, much to the disappointment of the first user. Or, the user may have recorded adult oriented media content, and the other user may be a young adult who should not have access to the adult oriented media content.

Accordingly, there is a need in the arts to manage safekeeping of stored media content on a flash memory device.

SUMMARY

Systems and methods of securely storing media content events on a flash memory device are disclosed. An exemplary embodiment receives user-provided authorization information, compares the received user-provided authorization information with authorization information associated with the flash memory device, and permits access to a flash memory of the flash memory device when the received user-provided authorization information corresponds to the authorization information.

BRIEF DESCRIPTION OF THE DRAWINGS

Preferred and alternative embodiments are described in detail below with reference to the following drawings:

FIG. 2 is a block diagram of an exemplary media device with an embodiment of the FM ID system.

DETAILED DESCRIPTION

Figure 1:
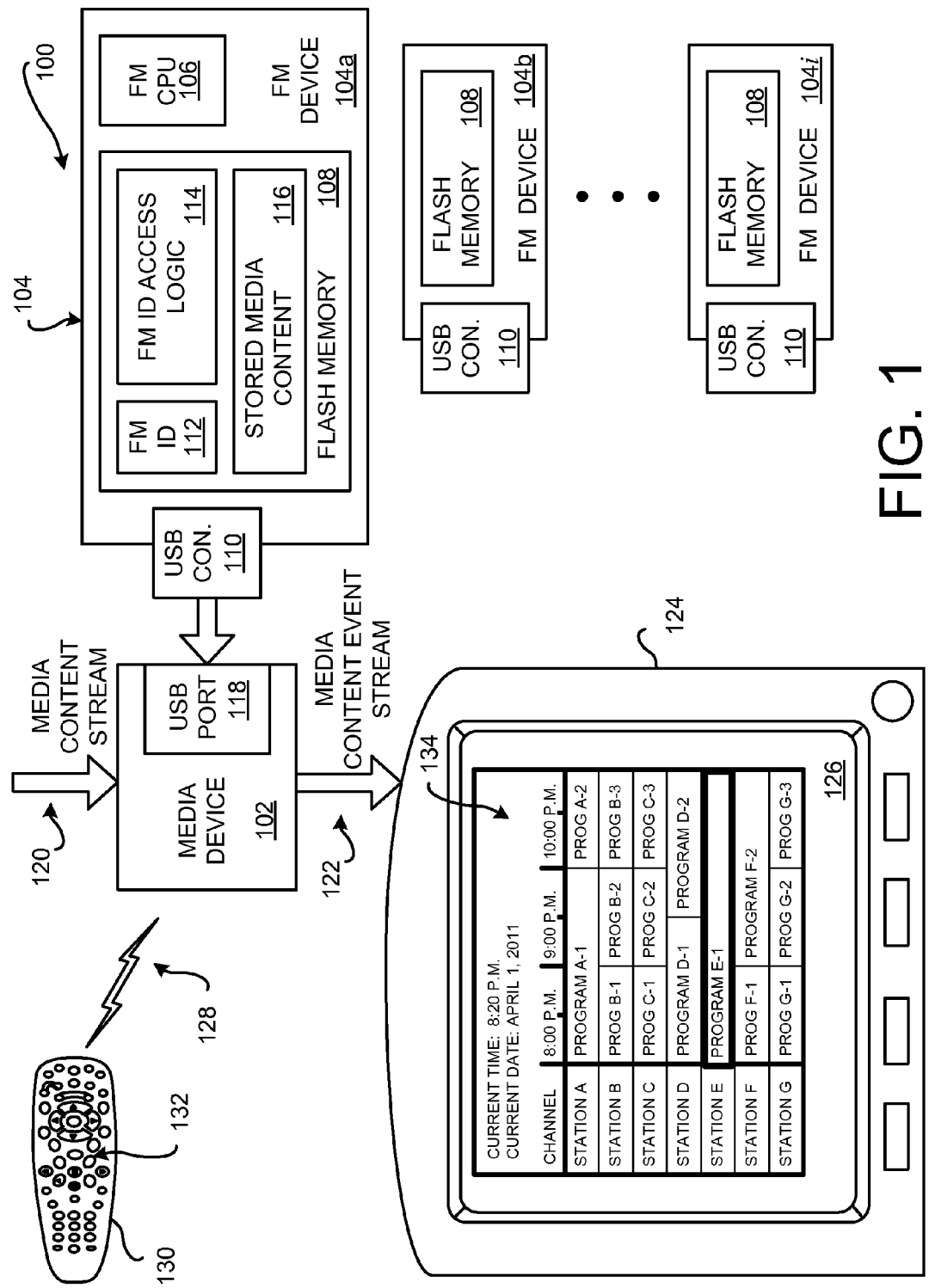
FIG. 1 is a block diagram of an embodiment of a flash memory (FM) identification (ID) system implemented in a media device and a plurality of flash memory devices.

FIG. 1 is a block diagram of an embodiment of a flash memory (FM) identification (ID) system 100 implemented in a media device 102 and a plurality of flash memory devices 104. Exemplary media devices 102 include, but are not limited to, a set top box (STB), a stereo, a surround-sound receiver, a radio, a television (TV), a digital video disc (DVD) player, a smart phone, a digital video recorder (DVR), a game playing device, or a personal computer (PC). Such exemplary media devices 102 are configured to access flash memory devices 104 upon which media content events may be stored, erased, and/or retrieved.

An exemplary embodiment of a flash memory device 104a is a universal serial bus (USB) flash memory stick. The exemplary flash memory device 104a comprises an optional flash memory central processor unit (CPU) 106, a flash memory 108, and a USB connector (Con.) 110. The flash memory 108 comprises portions for storing a flash memory identifier (FM ID) 112, FM ID access logic 114, and stored media content 116. The FM ID 112 stores an identifier of the flash memory device 104. Based upon the identifier stored in the FM ID 112, the FM ID access logic 114 controls storage of, erasure of, and access to the media content events stored in the stored media content 116.

The flash memory 108 may be any suitable persistent memory medium that comprises an erasable and reprogrammable transistor-type memory media that is configured with sufficient memory capacity to store, erase, and/or retrieve one or more media content events. In alternative embodiments, the flash memory identifier (FM ID) 112 and/or the FM ID access logic 114 may reside in other memory elements.

Embodiments of the flash memory device 104 are configured to communicatively couple to the media device 102. In an exemplary embodiment, the USB connector 110 of the flash memory device 104a is configured to slidably couple to the USB port 118 of the media device 102. Other embodiments of the flash memory devices 104 may employ other types of connectors that couple to the media device 102. Some embodiments may communicatively couple to the media device 102 using a suitable wireless medium, such as a radio frequency (RF) signal medium, an infrared (IR) signal medium, or the like.

When an authorized user communicatively couples the flash memory device 104 to the media device 102, authority of the user is verified before storing, erasing, and/or retrieving media content events from the flash memory device 104 is permitted. In an exemplary embodiment, authorization is based on the stored identifier residing in the FM ID 112. To authorize access to the flash memory device 104, the user provides authorization information corresponding to the stored identifier to the media device 102. Once the user-provided authorization information is communicated to the media device 102, the user is permitted to store, erase, and/or retrieve media content events using the flash memory device 104.

In operation, the media device 102 is configured to receive a media content stream 120 that comprises one or more media content events. The media device 102 is configured to process the received media content stream 120 and to communicate a media content event stream 122 to a media content presentation device 124, generically represented as a television or a TV. A video portion of the media content event stream 122 is presented on a display 126 of the media content presentation device 124. An optional audio portion of the media content event stream 122 is reproduced as audible sounds by speakers (not shown) of the media content presentation device 124 or by another media content presentation device. Other embodiments of the media content presentation device 124 may include a personal computer, a lap top computer, a personal device assistant, a net book, a smart phone, or other electronic media presentation device. Such embodiments may include the display 126 as an integrated component.

The media device 102 and/or the media content presentation device 124 are configured to receive wireless IR or RF signals 128 emitted by the remote control 130. The user, actuating one or more of the controllers 132 residing on a surface of the remote control 130, is able to generate commands to control operation of the media device 102 and/or the media content presentation device 124. For example, the user may wish to view available media content events. The user may selectively actuate the controllers 132 on the remote control 130 so that an electronic program guide (EPG) 134 is presented on the display 126.

The conceptual EPG 134 is configured to assist the user to select a media content event of interest. An EPG 134 is a type of a user interface that presents a menu, or a series of menus, with a combination of text and symbols to represent viewing choices that may be selected by the user. The available media content event information may include a title of available media content events, a scheduled presentation time and date, a brief subject matter description, and/or a "channel" that identifies the originating source of the media content event, such as a television studio, a premium movie provider, a national program provider, etc. Here, the media content event "Program E-1" is illustrated as being highlighted on the EPG 134. Upon selection by the user, the media content event corresponding to the "Program E-1" is presented to the user on the display 126.

Alternatively, or additionally, the user may elect to save the highlighted media content event "Program E-1" into the flash memory device 104a. To store the highlighted media content event "Program E-1" into the flash memory device 104a, the user couples the flash memory device 104a to the media device 102 by inserting the USB connector 110 into the USB port 118.

When the flash memory device 104 is coupled to the media device 102, power is provided for operation of the flash memory device 104 via the USB connector 110. In an exemplary embodiment, the FM CPU 106 communicates to the media device 102 that a user authorization is required before the user is permitted to have access to the flash memory device 104 to store, erase, and/or retrieve media content events. In response, an exemplary embodiment of the media device 102 prompts or otherwise queries the user for the user-provided authorization information when the flash memory device 104 is initially communicatively coupled to the media device 102. Alternatively, or additionally, the media device 102 may prompt or query the user when an access event occurs wherein the flash memory device 104 is accessed to store, erase, and/or retrieve media content events.

In an exemplary embodiment, the user provides the authorization information, via the remote control 130 or another suitable user interface (not shown), to the media device 102. The media device 102 communicates the user-provided authorization information to the flash memory device 104. The FM CPU 106, executing the FM ID access logic 114, compares the received user-provided authorization information with the identifier stored in the flash memory device 104. If the user-provided authorization information corresponds to the identifier stored in the FM ID 112, the FM CPU 106 replies to the media device 102 that the authorization has been verified. Accordingly, the user is permitted to store, erase, and/or retrieve media content events using the flash memory device 104.

For example, but not limited to, when the user selects the highlighted media content event "Program E-1" from the presented EPG 134, the media device 102 communicates the media content event stream, or other suitable media content, corresponding to the selected media content event "Program E-1" to the flash memory device 104a. The received media content event is then stored into the stored media content 116 portion of the flash memory 108. (In some embodiments, there may be intervening EPGs, pop windows, or the like, presented to the user to confirm and/or verify storage of the highlighted "Program E-1" into the flash memory device 104a.)

FIG. 2 is a block diagram of an exemplary media device 102 configured with an embodiment of the FM ID system 100. The non-limiting exemplary media device 102 comprises a media content stream interface 202, a processor system 204, a memory 206, a program buffer 208, an optional digital video recorder (DVR) 210, a presentation device interface 212, a remote interface 214, and in embodiments configured to couple to the USB type flash memory device 104, the USB port 118. Alternatively, or additionally, the media device 102 may comprise other types of flash memory device ports (not shown) that are configured to couple to other types of flash memory devices. Further, the media device 102 may include a receiver or transceiver (not shown) that is configured to receive RF or IR signals 128 from a wireless type flash memory device.

The memory 206 comprises portions for storing the media device logic 216, the flash memory (FM) identification (ID) processing logic 218, and an optional flash memory (FM) identifier (ID) 220. In some embodiments, the media device logic 216 and the FM ID logic 218 may be integrated together, and/or may be integrated with other logic. Other media devices 102 may include some, or may omit some, of the above-described media processing components. Further, additional components not described herein may be included in alternative embodiments.

The functionality of the media device 102, here a set top box, is now broadly described. A media content provider provides the media content stream 120 that is received at the media device 102 via a suitable media communication system (not shown). Non-limiting examples of such media communication systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 120 can be received from one or more different sources, such as, but not limited to, a cable system, a radio frequency (RF) communication system, or the Internet.

The one or more media content streams 120 are received by the media content stream interface 202. One or more tuners 222 in the media content stream interface 202 selectively tune to one of the media content streams 120 in accordance with instructions received from the processor system 204. The processor system 204, executing the media device logic 216, and based upon a request for a program of interest specified by the user, parses out media content associated with the media content event of interest. The media content event of interest is then assembled into a stream of video and/or audio information which may be stored by the program buffer 208 such that the media content event can be streamed out to the media presentation device 124, such as the television, via the presentation device interface 212. Alternatively, or additionally, the parsed out program content may be saved into the DVR 210 for later presentation. The DVR 210 may be directly provided in, locally connected to, or remotely connected to, the media device 102. The above processes performed by the media device 102 are generally implemented by the processor system 204 while executing the media device logic 216.

In practice, an exemplary embodiment of the flash memory device 104 is configured to communicate to the media device 102 that authorization from a user is required when the flash memory device 104 is initially coupled to the media device 102 and/or if an access event occurs. The FM CPU 106, executing the FM ID access logic 114, communicates the authorization request. At the media device 102, the processor system 204 executes the FM ID processing logic 218 to prompt or otherwise query the user for authorization information. Once the user-provided authorization information is received, the media device 102 communicates the user-provided authorization information, or an equivalent thereof, to the flash memory device 104. The flash memory device 104 compares the received user-provided authorization information with the identification information residing in the FM ID 112. If the received user-provided authorization information corresponds to the identification information residing in the FM ID 112, the media device 102 is allowed to store, erase, and/or retrieve media content events. If the received user-provided authorization information does not correspond to the identification information residing in the FM ID 112, the access to the flash memory device 104 is not permitted.

Media content events may be provided from any suitable source. For example, the media content event may be provided in the received media content stream 120, from the program buffer 208, from the DVR 210, from a remote server, from another memory medium coupled to the media device 102, or even from another flash memory device 104.

In an exemplary embodiment, the user-provided authorization information is the same as the identification information residing in the FM ID 112. For example, the user-provided authorization information and the identification information residing in the FM ID 112 may correspond to some series of alpha numeric characters, such as a password, a name, or the like, that is known only to the user.

In an exemplary embodiment, the identification information residing in the FM ID 112 can be defined by the user by inputting the authorization information to the media device 102, which communicates the received authorization information to the flash memory device 104. The flash memory device 104 stores the provided authorization information, as the identification information, into the FM ID 112. In such an exemplary embodiment, the user may actuate one or more of the controllers 132 on the remote control 130 to define a password, a name, or the like. In an exemplary embodiment, the media device 102 communicates the password, name, or the like to the flash memory device 104, which is stored into the FM ID 112. For example, the user may select the numeric sequence "1234" as the authorization identifier. The numeric sequence "1234" is stored into the FM ID 112. At a later time, the user enters the numeric sequence "1234" (here, the user-provided authorization information). Since the numeric sequence "1234" has been stored in the FM ID 112, authorization is confirmed and access to the flash memory device 104 is permitted.

Alternatively, or additionally, a menu (not shown) may be presented to the user on the display 126. The menu may provide for user selection of numbers and/or letters. The user, using the remote control 130, may navigate about the presented menu and define a suitable authorization identifier. For example, the user may select their nickname as the authorization identifier. Or, the user may select a more complicated alpha numeric string for greater security. The same menu, or another similar menu, may be later used to permit the user to specify the user-provided authorization information that is required to access the flash memory device 104.

The identification information residing in the FM ID 112 may be provided to the flash memory device 104 at various times. For example, but not limited to, the authorization information may be defined by the user when the flash memory device 104 is initially coupled to the media device 102. Alternatively, or additionally, the authorization information may be defined by the user when an access event occurs wherein the flash memory device 104 is initially accessed by the user to securely store one or more media content events. Further, the authorization information may be defined by the user when the flash memory device 104 accessed to store individual media content events. In some embodiments, the user may elect to change the identification information residing in the FM ID 112 at any other time, such as in situations where the user chooses to change their previously defined password, name, or the like.

In some embodiments, the flash memory device 104 may be initially provisioned with identification information residing in the FM ID 112. For example, the identification information residing in the FM ID 112 may be predefined by a manufacturer, vendor, or other entity prior to delivery of the flash memory device 104 to the user. In such embodiments, the predefined identification information residing in the FM ID 112 is initially communicated to the media device 102. The user, via the media device 102, may then elect to retain the predefined identification information residing in the FM ID 112, or may elect to change the identification information residing in the FM ID 112 to a more meaningful password, name, or the like.

In other embodiments, the predefined identification information residing in the FM ID 112 is fixed and cannot be modified. In such embodiments, a lookup table or other relational database is defined in the flash memory 108. The lookup table or other relational database may be stored in the FM ID 112, stored in another portion of the flash memory 108, or even stored in another memory medium. The user, via the media device 102, provides the initial authorization information which is stored into the lookup table or other relational database. The stored authorization information is associated with the predefined identification information residing in the FM ID 112.

When an access event occurs and the user-provided authorization information is communicated from the media device 102 to the flash memory device 104, the received user-provided authorization information is compared to the stored authorization information residing in the lookup table or other relational database. If the received user-provided authorization information corresponds to the authorization information residing in the lookup table or other relational database, which is associated with the predefined identification information residing in the FM ID 112, then access to the flash memory device 104 is permitted.

Alternatively, the media device 102 may store the lookup table or other relational database in its memory 206. The lookup table or other relational database may be stored in the FM ID 220, stored in another portion of the flash memory 108, or even stored in another memory medium. The user, via the media device 102, initially provides the authorization information which is stored into the lookup table or other relational database of the media device 102. The media device 102 also accesses the predefined identification information residing in the FM ID 112, which is stored into the lookup table or other relational database. The stored authorization information is associated with the predefined identification information received from the flash memory device 104. When an access event occurs and the user-provided authorization information is provided to the media device 102, the received user-provided authorization information is compared to the authorization information stored in the lookup table or other relational database of the media device 102. If the received user-provided authorization information corresponds to the authorization information in the lookup table or other relational database of the media device 102, which is associated with the predefined identification information residing in the FM ID 112 of the flash memory device 104, then access to the flash memory device 104 is permitted.

In embodiments that employ the lookup table or other relational database stored at the media device 102, the authorization function may be performed at the media device 102. Accordingly, a plurality of flash memory devices 104, each with different predefined identification information residing in their respective FM ID 112, may be associated with the same authorization information provided by the user. That is, the user may use a single password, name, or the like, to securely access a plurality of flash memory devices 104. When the authorized user couples one of the plurality of flash memory devices 104 to the media device 102, the media device 102 may access the predefined identification information residing in the FM ID 112 of that particular flash memory device 104. If the user-provided authorization information corresponds to the predefined identification information stored in the lookup table or other relational database, which is associated with the predefined identification information residing in the FM ID 112 of that particular flash memory device 104, then access to the flash memory device 104 is permitted.

Similarly, in embodiments that employ the lookup table or other relational database stored in the flash memory device 104, the authorization function may be performed at the flash memory device 104. Accordingly, a plurality of different users, each with different authorization information residing stored in the flash memory device 104, may be associated with particular media content events. That is, a first user may use their user-provided authorization information, such as a such as a password, a name, or the like, to securely access one or more media contents events that they have stored into the flash memory device 104. A second user may use a different password, name, or the like, to securely access one or more other media contents events that they have stored into the flash memory device 104. When an access event occurs wherein the first user attempts to access the flash memory device 104, the first user is limited to accessing those media content events associated with their user-provided authorization information. Similarly, when an access event occurs wherein the second user attempts to access the same flash memory device 104, the second user is limited to accessing those media content events associated with their user-provided authorization information.

Alternatively, or additionally, a media content event stored in the flash memory device 104 may be configured to be accessed by multiple users having different authorization information (passwords, names, or the like). In such situations, the different authorization information used by the different users is associated in the lookup table or other relational database with the same stored media content event. When an access event occurs wherein the first user attempts to access the flash memory device 104 for that particular media content event, the first user is permitted access based on their user-provided authorization information that is associated with the media content event. Similarly, when an access event occurs wherein the second user permitted access based on their user-provided authorization information that is associated with the media content event.

In some embodiments, unsecured media content events may be stored into the flash memory device 104. Such unsecured media content events may be accessed by either the first user or the second user in an unsecured manner. For example, the first user may have stored a first media content event into the flash memory 108. At some later time, the first user may store a second media content event into the flash memory 108 that is secured by embodiments of the FM ID system 100. An exemplary embodiment may use a flag or the like to indicate that access to the second media content event must first be authorized. When an access event occurs where the unauthorized second user attempts to access the stored and secured second media content event, the media device 102 prompts or otherwise queries the unauthorized second user for authorization information. Since the unauthorized second user cannot provide the correct user-provided authorization information, the unauthorized second user is denied access the secured second media content event.

In an alternative embodiment, the media device 102 may entirely manage the authorization and access process. In such embodiments, the flash memory device 104 may omit the FM ID access logic 114. The FM CPU 106 is limited to managing the electronic reading and writing functions for its respective flash memory 108. The media device 102 defines, and then communicates, identification information to the flash memory device 104. The received identification information is then stored as a data file or the like in the flash memory 108. The identification information may be stored like any other conventional data file that is storable in the flash memory 108. For example, but not limited to, a stored data file may have header information, a file name, or other information is used to denote that the stored data corresponds to the identification information. The media device 102 may check for such data files, and if found, may then require authorization before access is permitted. Thus, embodiments of the FM ID system 100 may be used by to provide secured access to a legacy flash memory device 104.

Some types of flash memory devices 104 may not have the FM CPU 106. Access to media content events is then managed by the media device 102.

In such embodiments where security is managed by the media device 102, the media device 102 checks to see if the flash memory device 104 has been secured using the stored data file with the authorization identifier. If no data file with the authorization identifier has been saved into the flash memory device 104, then the media device 102 permits uncontrolled access to the flash memory device 104 so that the user is permitted to store, erase, and/or retrieve media content events. On the other hand, if a data file with an authorization identifier has been saved into the flash memory device 104, then the media device 102 prompts or otherwise queries the user for the user-provided authorization information before access to the flash memory device 104 is permitted.

Embodiments are configured to permit an authorized user to store, erase, and/or retrieve media content events using the secured flash memory device 104. Alternatively, some embodiments may permit the storing of media content events onto the flash memory device 104 in the absence of authorization of a user. Later authorization is then required from the authorized user to permit retrieving the secured media content events from the flash memory device 104. Additionally, or alternatively, authorization may be required from the authorized user to permit the erasing and/or overwriting of stored media content events from the flash memory device 104.

In some embodiments, the authorization information may be included as part of the stored media content event. For example, the authorization information may be saved into a header, metadata, or elsewhere in the flash memory 108. When an access event occurs where a user attempts to access the stored and secured media content event, the media device 102 prompts or otherwise queries the user for the user-provided authorization information. The received user-provided authorization information is then compared to the stored authorization information residing in the media content event. If the user-provided authorization information corresponds to the stored authorization information, access is permitted. Otherwise, access to the stored media content event is denied.

Additionally, or alternatively, in embodiments that permit individual media content events to be secured in the flash memory 108, a plurality of users may be individually authorized to store, erase, and/or retrieve media content events using the same flash memory device 104. For example, a first authorized user may securely store one or more media content events in the flash memory device 104. The first user may define their own authorization identifier, or may be assigned an authorization identifier by the media device 102 or the flash memory device 104. A second authorized user may also securely store other media content events in the flash memory device 104. The second user may define their own different authorization identifier, or may be assigned a different authorization identifier by the media device 102 or the flash memory device 104. Accordingly, the second user will be denied access to the media content events stored by the first user. Similarly, the first user will be denied access to media content events stored by the second user. In such embodiments, the authorization identifiers of the stored media content events are associated with the flash memory device, either inherently associated by virtue of their residence on the flash memory device 104, and/or directly associated with a particular flash memory identifier residing in the FM ID 112 portion of the flash memory 108.

In the various embodiments, an optional flash memory device EPG 224 may be generated by the media device 102 and presented on the display 126 of the media content presentation device 124. The exemplary flash memory device EPG 224 presents information that identifies media content events stored on the flash memory device 104 that is currently coupled to the media device 102. For example, the title of a stored media content event may be presented so that the user understands which media content events have been stored on the media device 102.

In practice, when the flash memory device 104 is communicatively coupled to the media device 102, the media device accesses a content listing maintained by the flash memory device 104. The listing indicates which media content events are secured. Alternatively, the media device may read the stored contents of the flash memory device 104 to identify stored media content events. The flash memory device EPG 224 may then be based on the identified stored contents.

Other information may also be presented in the flash memory device EPG 224. For example, but not limited to, a duration of the stored media content event may be indicated. A source of the stored media content event may be optionally indicated. Information pertaining to the used and/or unused capacity of the flash memory 108 may be indicated on the flash memory device EPG 224. Information identifying the user and/or information identifying the flash memory device 104 may be included on the presented flash memory device EPG 224. Some media content events may be secured, while other media content events may be unsecured. Accordingly, the flash memory device EPG 224 may indicate whether a particular media content event is secured or not using text or a graphical icon.

For example, the media content event identified as "MC Event 3" is illustrated as being highlighted in the exemplary flash memory device EPG 224. An icon shown next to the highlighted media content event "MC Event 3" indicates that it is secured. In contrast, a different icon next to the media content event "MC Event 2" indicates that this media content event is not secured, and thus is accessible by any other user.

Upon selection of the media content event "MC Event 3" by the user, embodiments of the FM ID system 100 prompt or otherwise query the user for authorization information. If the correct user-provided authorization information is received, then access to the media content event "MC Event 3" is permitted.

Some embodiments of the media device 102 may be configured to communicate to remote electronic devices. For example, the media device 102 may be configured to communicate over the Internet or a WiFi system to a smart phone or the like. In such embodiments, access authorization to the flash memory device 104 may be managed from the remote electronic device. Additionally, or alternatively, the storage of, the erasure of, and the access to the media content events of the flash memory device 104 may be managed from the remote electronic device.

Similarly, the flash memory device 104 may be coupled to the remote electronic device. Access authorization to the flash memory device 104 coupled to the remote electronic device may be managed from the media device 102. Additionally, or alternatively, the storage of, the erasure of, and the access to the media content events of the flash memory device 104 may be managed from the media device 102.

It should be emphasized that the above-described embodiments of the FM ID system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method for securely storing media content events on a flash memory device, the method comprising:
   storing a first media content event received from a first media device into a flash memory of the flash memory device, wherein the flash memory device is slidably coupled to a port of the first media device, wherein the first media device received the first media content event in a media content stream, and wherein first authorization information is saved as a part of the media content event;
   storing a second media content event into the flash memory, wherein the second media content event includes second authorization information saved as a part of the second media content event while being stored in the flash memory of the flash memory device, wherein the second authorization information is different from the first authorization information;
   receiving, at the flash memory device, user-provided authorization information, wherein the user-provided authorization information is received from one of:
      the first media device while the flash memory device is slidably coupled to the first media device, and
      a second media device while the flash memory device is slidably coupled to a port of the second media device;
   comparing, using a flash memory central processing unit (CPU) of the flash memory device, the received user-provided authorization information with the first authorization information associated with the first media content event stored in the flash memory of the flash memory device; and
   permitting access to the first media content event stored in the flash memory of the flash memory device only when the received user-provided authorization information corresponds to the first authorization information saved as part of the first media content event; and
   permitting access to the stored second media content event stored in the flash memory of the flash memory device only when the received user-provided authorization information corresponds to the second authorization information saved as part of the second media content event, wherein the method further comprises:
generating a flash memory device electronic program guide (EPG) that identifies at least the first and second media content events stored in the flash memory; and
communicating the flash memory device EPG to a presentation device,
wherein the presented flash memory device EPG indicates at least the stored first and second media content events, indicates that the stored first media content event is secured by the first authorization information that is saved as part of the first media content event, and indicates that the stored second media content event is secured by the second authorization information that is saved as part of the second media content event.

2. The method of claim 1, wherein the storing comprises:
receiving the first authorization information at the flash memory device, wherein the first authorization information is received as part of the storing process while the first media content event is being stored into the flash memory of the flash memory device; and
storing the first authorization information into a header of the first media content event as part of the storing process while the first media content event is being stored in the flash memory of the flash memory device.

3. The method of claim 1, wherein permitting access to the flash memory comprises:
communicating at least one of the previously stored first and second media content events to a media device.

4. The method of claim 1, wherein permitting access to the flash memory comprises:
erasing at least one of the previously stored first and second media content events from the flash memory.

5. The method of claim 1, wherein the flash memory device is a first flash memory device, and further comprising:
communicating the first media content event with the saved first authorization information therein from the first flash memory device into a second flash memory device that has a flash memory CPU therein, wherein the flash memory CPU of the second flash memory device is configured to permit access to the first media content event only in response to receiving the corresponding user-provided authorization information.

6. The method of claim 1, further comprising:
denying access to the first media content event residing in the flash memory of the flash memory device when the received user-provided authorization information does not correspond to the first authorization information saved as part of the first media content event.

7. The method of claim 1, wherein the storing comprises:
receiving the first authorization information at the flash memory device; and
storing the first authorization information into a metadata file of the first media content event stored in the flash memory device.

8. The method of claim 1, wherein the flash memory device is a first flash memory device, and further comprising:
communicating the previously stored first media content event with the first authorization information saved therein to a second flash memory device,
wherein the second flash memory device stores the received first media content event with the first authorization information saved therein, and
wherein access to the first media content event is permitted only when newly received user-provided authorization information is provided that corresponds to the first authorization information saved as part of the media content event.

9. The method of claim 1,
wherein the flash memory device is a first flash memory device,
wherein the second media content event with the second authorization information saved therein is received from a second flash memory device and is stored in the flash memory of the first flash memory device.

10. The method of claim 1, wherein the flash memory device is a first flash memory device, and further comprising:
communicating the first media content event with the saved first authorization information therein from the first flash memory device into a second flash memory device that does not have a flash memory CPU configured to permit access to the first media content event only in response to receiving the corresponding user-provided authorization information,
wherein the stored first media content event cannot be accessed by the second media device.

11. A flash memory device, comprising:
a connector configured to communicatively couple to a port of a media device, wherein user-provided authorization information is received by the flash memory device from the media device;
a flash memory comprising:
a first portion configured to store flash memory identification (ID) access logic that is configured to:
compare the user-provided authorization information with first authorization information saved as part of a first media content event residing in the flash memory device and with second authorization information saved as part of a second media content event residing in the flash memory device,
permit access to the first media content event residing in the flash memory only when the received user-provided authorization information corresponds to the first authorization information,
permit access to the second media content event residing in the flash memory only when the received user-provided authorization information corresponds to the second authorization information; and
a second portion configured to store at least the first media content event with the first authorization information therein and the second media content event with the second authorization information therein; and
a central processor unit (CPU) communicatively coupled to the flash memory and the connector, and upon executing the flash memory ID access logic, is configured to:
compare the received user-provided authorization information with the stored first authorization information saved as part of the first media content event;
permit access by the media device to the first media content event residing in the flash memory when the received user-provided authorization information corresponds to the first authorization information, wherein access to the first media content event is provided while the media device is currently slidably coupled to the flash memory device;
deny access to the first media content event residing in the flash memory when the received user-provided authorization information does not correspond to the first authorization information;
permit access by the media device to the second media content event residing in the flash memory when the received user-provided authorization information corresponds to the second authorization information, wherein access to the second media content event is provided while the media device is currently slidably coupled to the flash memory device;

deny access to the second media content event residing in the flash memory when the received user-provided authorization information does not correspond to the second authorization information;

identify media content events stored on the flash memory;

generate a flash memory device electronic program guide (EPG) that identifies the stored media content events; and communicating the flash memory device EPG to a presentation device, wherein the presented flash memory device EPG indicates the stored media content events, and indicates which of the stored media content events are secured by the authorization information that is saved as part of the media content event.

12. The flash memory device of claim 11, wherein the connector is a universal serial bus (USB) connector that is configured to communicatively couple to a USB port of the media device.

13. The flash memory device of claim 11, wherein the CPU, upon executing the flash memory ID access logic, is further configured to:

receive the authorization information associated with the first media content event from user provided information; and store the first media content event with the authorization information therein to the flash memory.

14. The flash memory device of claim 11, wherein the first authorization information is saved into one of a header and a metadata file of the first media content event that is stored in the flash memory.

15. A method for securely accessing media content events stored in a flash memory of a flash memory device by a media device when the flash memory device is slidably coupled to a port of the media device, wherein authorization information is saved as a part of the media content events, and wherein the flash memory device includes a flash memory central processing unit (CPU) that is configured to compare received user-provided authorization information with the authorization information, the method comprising:

receiving, at the flash memory device received from the media device, the user-provided authorization information;

comparing, using the flash memory CPU, the received user-provided authorization information with first authorization information of a first media content event stored in the flash memory of the flash memory device;

comparing, using the flash memory CPU, the received user-provided authorization information with second authorization information of a second media content event stored in the flash memory of the flash memory device;

permitting access by the media device to the first media content event stored in the flash memory of the flash memory device only when the received user-provided authorization information corresponds to the first authorization information saved as part of the first media content event; and permitting access by the media device to the second media content event stored in the flash memory of the flash memory device only when the received user-provided authorization information corresponds to the second authorization information saved as part of the second media content event, wherein the access is permitted only when the received user-provided authorization information is received from the media device while the flash memory device is coupled to the media device, wherein the method further comprises:

generating a flash memory device electronic program guide (EPG) that identifies at least the first and second media content events stored in the flash memory; and communicating the flash memory device EPG to a presentation device, wherein the presented flash memory device EPG indicates at least the stored first and second media content events, and indicates that the stored first and second media content events are secured by the respective first and second authorization information.

16. The method of claim 15, wherein the media device accessing the media content events stored in the flash memory of the flash memory device is a first media device, and wherein at least the first and second media content events were previously stored in the flash memory of the flash memory device by a second media device.

17. The method of claim 15, wherein the first authorization information is saved into a header of the first media content event that is stored in the flash memory device.

18. The method of claim 15, wherein the first authorization information is saved into a metadata file of the first media content event that is stored in the flash memory device.

* * * * *